April 21, 1964  C. D. VISOS  3,129,650
MANUAL RELEASE FOR AUTOMATIC TOASTER
Filed Aug. 17, 1959  2 Sheets-Sheet 1

INVENTOR:
Charles D. Visos,
BY Bair, Freeman & Molinare
ATTORNEYS.

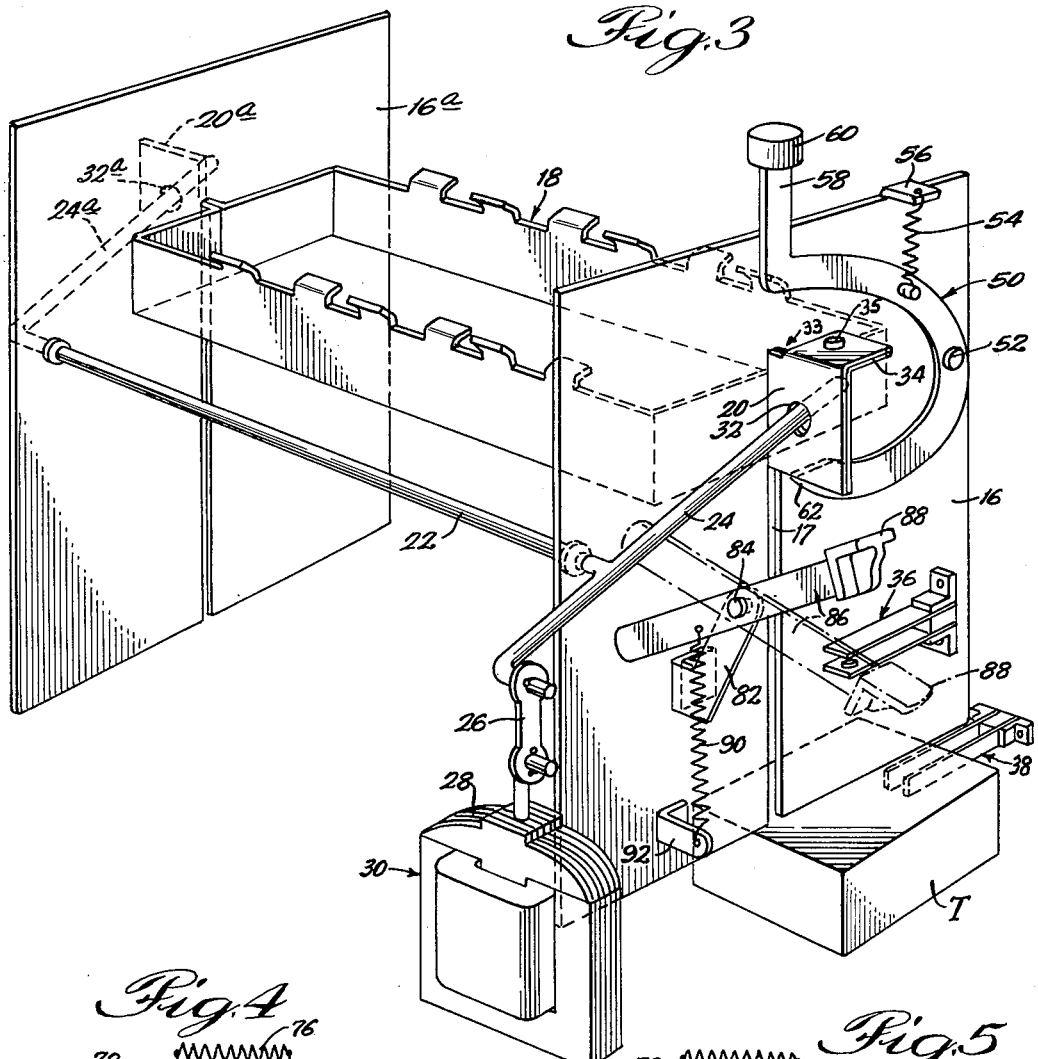

United States Patent Office 3,129,650
Patented Apr. 21, 1964

3,129,650
MANUAL RELEASE FOR AUTOMATIC TOASTER
Charles D. Visos, St. Louis, Mo., assignor to Knapp-Monarch Company, St. Louis, Mo., a corporation of Delaware
Filed Aug. 17, 1959, Ser. No. 834,201
6 Claims. (Cl. 99—329)

This invention relates to a toaster and more particularly relates to a semi-automatic toaster which is provided with a manual control for selectively raising the bread carriage of the toaster which, but for the manual control, would normally proceed through a toasting cycle in uninterrupted fashion.

The instant application is, in part, an improvement over the toaster disclosed in my co-pending application, Serial No. 772,897, filed November 10, 1958, entitled "Semi-Automatic Toaster," and is a continuation-in-part of my said co-pending application.

One object of this invention is to provide a toaster which is provided with a manually actuatable and manually releasable cam-type restraint which may be selectively manually actuated to initiate a toasting cycle, and which thereafter operates fully automatically to time out the toasting cycle and to return the bread-supporting carriage to its initial position pending the initiation of a new cycle.

Another object of the present invention is to provide an improved semi-automatic bread toaster which is of simple, inexpensive and yet reliable construction and embodying features of construction, combination and arrangement which render it particularly suitable for domestic use.

In the said co-pending application there is disclosed a simplified toaster which has a movable bread carriage therein for movement between up and down positions and wherein a simple manually releasable latch maintains the carriage in the up position, so that upon release of said latch means, the carriage moves under gravity to the down position, and wherein there are provided toasting means and timing means which operate while the carriage is in the down position until the timer terminates the end of the toasting period, at which time a motor means, which requires no potentialization during the movement of the carriage to down position, is operated to effect movement of the bread carriage to the up position where it is automatically latched by said latch means preparatory to initiating another toasting cycle.

From the foregoing, it will be seen that the toaster disclosed in my co-pending application, Serial No. 772,897, now Patent No. 3,051,074, is required to operate through an entire toasting cycle before the bread carriage will return to the raised position. However, there are many instances when a party desires to interrupt the toasting cycle, or to view the bread slice being toasted to determine its condition, at a time prior to the normal automatic termination of the toasting cycle. In such instances, it is desirable to provide means for selectively raising the bread carriage independently of the normal automatic means provided by the toaster for raising the carriage only after termination of the toasting period.

Thus, a further object of this invention is to provide an improved semi-automatic toaster of the type wherein the bread carriage is normally raised to its up position automatically after completion of the toasting period for the toaster, and which toaster is further provided with a manual control for raising the bread carriage prior to the bread carriage being raised by the automatic means provided therefor within the toaster.

Still another object of this invention is to provide a toaster with automatic control means therein for normally effecting the movement of the toaster's bread carrier to its up position, and which toaster is provided with a manual control which is independent of said automatic control means and which is arranged for selectively raising the bread carrier when in lowered position to selected elevations, including the elevation at which the bread carrier is latched in its up position.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which.

Figure 1:
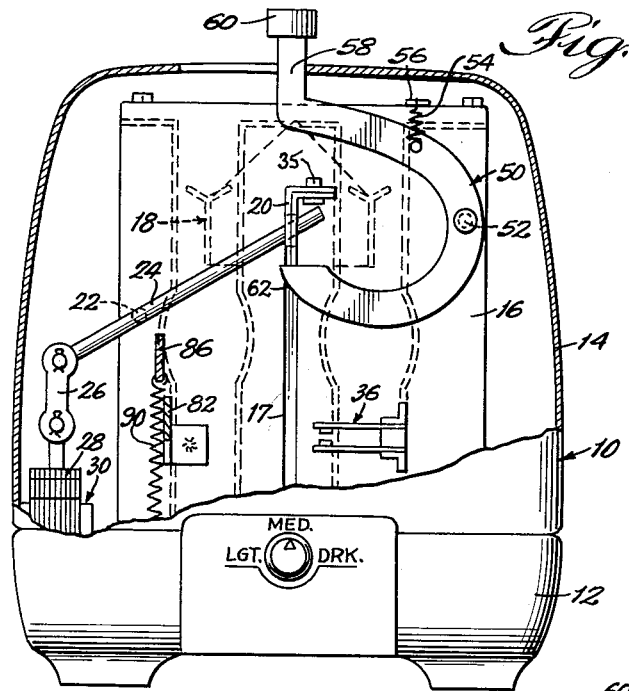
FIGURE 1 is an end elevation view with parts broken away illustrating certain portions of a toaster embodying the present invention.
Figure 2:
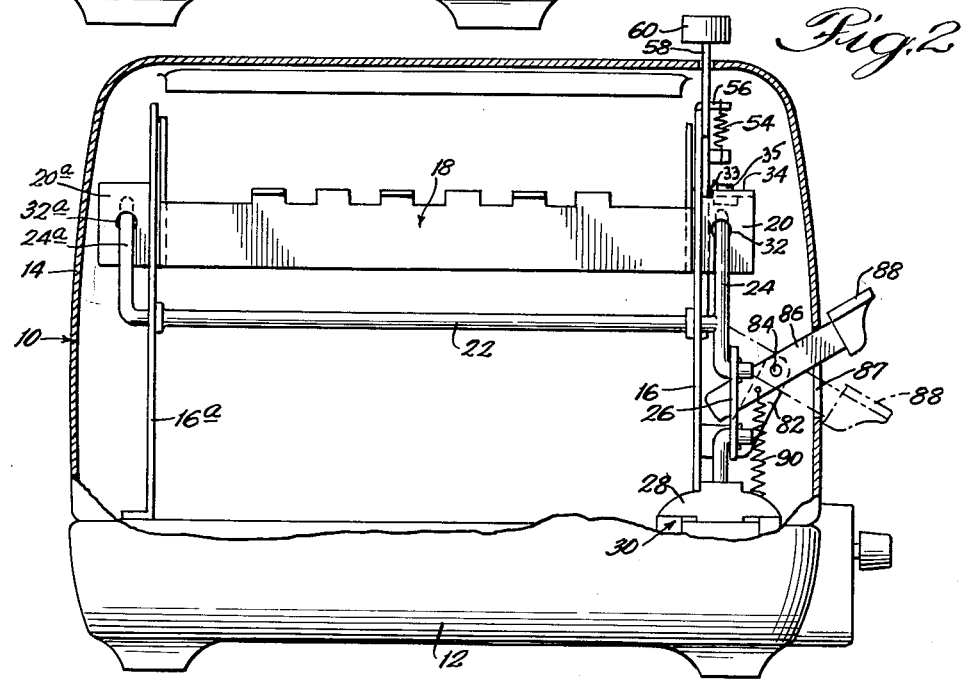
FIGURE 2 is a side elevation view of the toaster of FIGURE 1, showing the manual carriage-elevating control in full lines in its normal position, and in dot-dash lines, as when it is depressed for raising the bread carriage.

FIGURE 3 is an enlarged, perspective, fragmentary view illustrating portions of a toaster embodying the invention, and particularly illustrating the first manual control for effecting release of the carriage to initiate a toasting cycle, and illustrating the second manual control for selectively effecting raising of the bread carrier when the carrier is in lowered position and prior to normal automatic raising of the carriage by the automatic means provided therefor;

FIGURE 4 is a schematic diagram of one type of circuit for the toaster of FIGURES 1 to 3; and FIGURE 5 is a schematic circuit diagram of a modified form of circuit for the toaster of FIGURES 1 to 3.

Referring now to the figures, the toaster is generally indicated as 10, and includes a base 12 and an upper sheet metal casing 14 which encloses the bread carriage and other portions of the toaster. Positioned within the casing 14 are a pair of spaced end panels 16 and 16a, between which are located the toasting elements and the toasting chambers within which bread is positioned for toasting, and on the outside of end panel 16 are located certain operating elements and mechanisms of the toaster.

The foregoing structure, including the casing and the end panels 16 and 16a, are stationary structure, in contrast with the movable bread carrier within the toaster which moves up and down relative to said stationary structure. The movable bread carrier is indicated at 18 and has vertically disposed control portions 20 and 20a connected thereto and movable therewith. The control portions 20 and 20a of the bread carrier project outwardly of end panels 16 and 16a through elongated, vertical, track-like slots 17 and 17a in said end panels 16 and 16a, and said control portion 20 is disposed on the control side of end panel 16, while the remainder of the bread carrier 18 is disposed to the other side of panel 16.

Pivotally mounted on panels 16 and 16a by means of elongated shaft 22, are elongated arms 24 and 24a with one end of each of said arms being operatively engaged with the control portions 20 and 20a of the bread carrier. The other end of arm 24 is extended to the other side of shaft 22 and is connected by means of a pivoted link 26 to a plunger portion 28 of a solenoid motor generally indicated at 30. The control portions 20 and 20a of the bread carrier 18 have enlarged cutouts 32 and 32a through which the ends of arms 20 and 20a extend and by means of which there is provided an operative connection between the bread carrier 18 and the arms 24 and 24a. The control portion 20 also has a laterally extending flange portion 34 which is spaced from panel 16 to define a space 33 for accommodating a cam as hereinafter described. Flange 34 carries a ceramic button 35, a portion of which protrudes below flange 34.

Positioned across the path of movement of the flange 34 is a normally open switch, generally indicated at 36, and the cooperation of flange 34 and switch 36 is such that when bread carriage 18 moves to its lowermost position, the flange 34, through ceramic button 35 deflects the upper switch blade of switch 36 and operates to close the switch 36 to initiate the energization of the heater elements and so as to initiate the toasting cycle. A toasting-cycle-timing means, generally indicated at T, is also positioned in the toaster, and, as well known in the art, the timing means T operates not only to time the energization of the heater elements, but also serves thereafter to terminate the toaster-heating-cycle. The timing means T may be of any well-known construction, as shown in Patent No. 2,778,902 granted January 22, 1957, and as designated in FIGURES 4 and 5 is preferably a thermal-type timer.

In the process of terminating the toasting cycle, the timer means T is caused to close a switch generally indicated at 38, and this operates to energize the solenoid 30 which causes sudden downward movement of the solenoid plunger 28 and accompanying upward movement of the bread carriage 18. The upward movement of the bread carriage 18 operates to effect reopening of the main switch 36, which in turn effects the de-energization of the solenoid 30. However, before solenoid 30 is de-energized, the magnetic force from the coil of solenoid 30 has been sufficient to effect accelerating movement of the solenoid plunger 28 downwardly and of the bread carrier upwardly, so that the bread carrier 18 will have sufficient inertia, after de-enerization of the coil of solenoid 30, to move sufficiently high to effect the carriage control portion 20 being engaged and secured in the "up" position, to thereby terminate the full toasting cycle, and to thereby position the bread carrier 18 for the receipt thereon of a fresh slice of bread and for the beginning of a new toasting cycle.

In order to maintain the bread carrier 18 in the raised position, there is provided the generally U-shaped latch arm 50 which is pivoted on a pin 52 carried by panel 16. The pivot pin is connected to the U-shaped lever arm 50 substantially at the mid-point of the bight of the U, and the lower portion of the U is arranged to engage the under, or lower, edge of the vertical control portion 20 of the bread carriage 18 in the manner shown in FIGURES 1 and 3, to support the bread carriage 18 in the "up" position. The U-shaped arm 50 is normally maintained in the position shown in FIGURES 1 and 3 by means of a spring 54 which connects at one end to the upper portion of arm 50 and at its other end to an abutment 56 on the end panel 16.

The upper portion of the U-shaped arm 50 has an upwardly extending portion 58 which extends above panel 16 and outwardly of the toaster casing 14 and is provided with a manually engageable control button 60 at the upper terminus thereof. By swinging the control button 60 to the left as viewed in FIGURES 1 and 3, the lower portion of the U-shaped arm is swung away from its holding position, as seen in said figures, and the bread carrier 18 will begin to move to the "down" position at the same time moving solenoid plunger 28 away from the coil of solenoid 30. Thereafter, upon release of the control button 60, the spring 54 operates to swing the U-shaped arm 50 back to its initial condition, wherein the extended end of the lower portion of the U-shaped arm 50 is positioned across the path of upward movement of the actuator 20 from its lower position to its upper position.

The under edge of the lower portion of the U-shaped member 50 is shaped to provide a cam edge 62 thereat so that when the bread carriage 18 moves towards its "up" position, the upper edge of actuator 20 adjacent space 33 will engage the cam 62 and will automatically cause pivoting of the U-shaped latch 50 counter-clockwise with respect to the pivot pin 52, and out of the path of movement of the control portion 20, thereby permitting the bread carriage 18 to rise to its uppermost position and past the latching portion to where it clears the lower portion of the U-shaped latch member 50, and the spring 54 then operates automatically to swing the lower portion of the U-shaped latch member 50 back to its latching position as shown in FIGURES 1 and 3, thereby resetting the entire mechanism preparatory to initiating a new cycle.

The basic electrical elements in the circuit for a toaster as herein described are shown in two arrangements illustrated in FIGURES 4 and 5. In FIGURE 4 there is shown a service plug 70 with electrical leads 72 and 74 extending therefrom. The toaster heating elements are 76 and the main switch 36, when closed, completes the circuit through toaster heating elements 76. The circuit also includes a bimetal heater 78 which is part of the timer means T, and a normally closed shunting switch 38'. The timer means T is of the well-known type which operates through means (not shown) to effect opening of switch 38' in response to heater 78 to initiate termination of a toasting cycle. Upon switch 38' being opened, the entire line current passes through solenoid coil 30 to cause operative energization thereof, and the toasting cycle is then terminated as described hereinabove. FIGURE 4 also shows the use of a heat-up-limit switch 80 in the circuit which is normally open but operates to close just prior to the end of the toasting cycle so as to shunt and de-energize the bimetal heater 78. Neither the details of the timer T nor the use of switch 80 constitute a part of this invention but are referred to in order to disclose an operative system.

In FIGURE 5, the solenoid coil 30 is connected across the heatting elements 76. In this form, the switch 38 is normally open and hence coil 30 is de-energized. The heater 78 of timer means T operates to effect closure of switch 38 at a selected time, and this energizes coil 30 to effect movement of the bread carriage to effect termination of a toasting cycle.

The structure thus far described provides a manual control for a semi-automatic toaster such that by actuating only the manual control, the bread carriage is released to initiate the beginning of a fully automatic toasting cycle, and the carriage then moves downward to its toasting position in which the heaters of the toasting circuit are energized, and thereafter the timing means of the toasting means terminates the toasting cycle, after which the bread carriage is actuated upwardly automatically to move towards its sustained lifted position, and during its upward travel, the bread carriage operates to automatically actuate the latching means to permit the bread carrier to be latched in its lifted position, and the latch means operates automatically to restrain the carrier in the "up" position preparatory to the initiation to a new toasting cycle.

Now, in order to provide a manual control for selectively raising the bread carrier 18, at a time in the toasting cycle prior to the bread carrier being normally raised by the motor, or solenoid, 30 there is provided a bracket 82 connected to the outer side of end panel 16 and which carries thereon a headed pivot pin 84. An elongated control lever 86 is pivotally mounted on a reduced portion of pivot pin 84 between the bracket 82 and the enlarged head of pivot pin 84. The elongated control lever 86 is mounted for pivoting in a vertical plane located between a pair of spaced vertical planes which may be considered to extend through the pivot axis of elongated shaft 22 and through control portion 20 of the bread carrier 18. As best seen in FIGURE 1, the plane in which said control lever 86 pivots is located rather closely adjacent the axis of the shaft 22, so as to effect a wide range of selective movements to carriage 18 under the control of lever 86, without the necessity of providing for a wide arc of pivoting of the lever 86. The lever 86 is adapted to effect raising of carriage 18 to selected elevations including the "up" position wherein latch member 50 operates to latch the carriage, as seen in FIGURES 1 and 3.

The innermost portion of control lever 86, the portion extending from pivot pin 84 in the direction toward end panel 16, is positioned to swing in an arc transverse to the arm 24 of the lever arm means which operates to effect movement of the bread carriage 18. This arrangement provides that the control lever 86 may effect movement of the lever arm means through engagement with and influence on arm 24 by the control lever 86. The portion of the control lever 86 extending outwardly of pivot pin 84 is of a length to extend through a vertically elongated slot 87 provided in the casing 14 of the toaster, and the outermost portion of control lever 86 is equipped with a manual control button 88 thereon which provides for ease in manipulating the control lever 86 as desired.

The control lever 86 is normally biased to the full-line position shown in FIGURES 2 and 3, in which position said innermost portion, or lever-arm-means-engaging portion, of the control lever 86 is spaced below the arm 24 and outside of the normal range of movement of said arm 24. The lever 86 is biased to said full-line position by means of a spring 90 which is connected at its upper end to the innermost portion of control lever 86 and which is connected at its lower end to a bracket 92 carried on the outer side of end panel 16. FIGURES 2 and 3 illustrate in dot-dash lines the extreme position assumed by the manual control 86 in effecting raising of the arm 24 to the position such that the bread carriage 18 is raised to where it is latched in elevated position by the latch means 50.

From the foregoing it will be understood that after initiation of the toasting cycle in the manner above described, if a person wishes to view the condition of the toast prior to normal termination of the toasting cycle, the party depresses the control button 88, thereby raising the bread carriage 18 and permitting viewing of the condition of the toast within the toaster. If the bread is not sufficiently toasted, by releasing manual control button 88, gravity operates to restore bread carrier 18 to its lowered position where the timer T continues to time out the toasting of the bread. If the party raising the bread decides that the bread is sufficiently toasted, then by further depressing manual button 88, the carriage is raised to a position such that the latch means 50 latches the bread carriage in the "up" position, from whence the finished toast may be removed.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. An automatic toaster comprising, in combination, stationary structure defining a toasting chamber, a movable bread carrier in said toasting chamber having a control portion extending outwardly of said toasting chamber, bread-toasting means in said toasting chamber, movable latch means engaging said control portion for maintaining the bread carrier in raised condition, a first manual control for moving said latch means out of a latching position to permit the bread carrier to freely move under gravity to a lowered bread-toasting position, normally open switch elements connected in circuit with the toasting means, means to close said switch means to initiate a toasting operation and to maintain said switch means closed only when the bread carrier is in fully lowered bread-toasting position, a motor for raising the bread carrier, toasting-cycle-terminating means operable after a predetermined time interval to automatically energize the motor to thereby initiate raising the bread carrier upon completion of the toasting operation, and a second manual control separate from the bread carrier and comprising an elongated lever pivotably mounted intermediate its ends on said stationary structure for engaging and manually raising the bread carrier, prior to the bread carrier being automatically raised by said motor, to selected elevations.

2. In an automatic toaster of the type having stationary structure, toasting means therein, and movable structure including a movable bread carrier, a motor, and means for transmitting movement of the motor to said bread carrier; the improvement comprising, in combination, a movably mounted latch member for engaging a portion of said movable structure to normally maintain the bread carrier in a raised position, a first manual control for moving said latch means out of latching position to permit the bread carrier to freely move by gravity to a lowered, bread-toasting position, normally open switch elements connected in circuit with the toasting means, means to close said switch means when the bread carrier is only in fully lowered, bread-toasting position to initiate a toasting operation, toasting-cycle-terminating means operable after a predetermined time interval to automatically energize the motor and thereby initiate raising the bread carrier upon completion of the toasting operation, said latch member being movable automatically, during upward movement of said bread carrier, into position of latching engagement with movable structure, to maintain the bread carrier in a raised position, and a second manual control separate from said movable structure and comprising an elongated lever pivotably carried on said stationary structure for engaging and manually raising the bread carrier, prior to the bread carrier being raised by said motor, to selected elevations including an elevation at which the latch member latches the movable structure in raised position, thereby providing selective access to the toast prior to said automatic termination of the toasting operation at the end of the said time interval.

3. An automatic toaster comprising, in combination, stationary structure defining a toasting chamber, a movable bread carrier in said toasting chamber having a control portion extending outwardly of said toasting chamber, bread-toasting means in said toasting chamber, elongated lever arm means pivoted intermediate its ends to the stationary structure outside of said toasting chamber and to one side of said control portion, one end of said arm means being operatively connected with said carrier through said control portion and the other end of said arm being connected to motor means, a normally open switch in circuit with said bread toasting means and positioned to be closed by the control portion of said bread carrier when the bread carrier is down in toasting position, toasting-cycle-terminating means operable to energize said motor and to move said bread carriage through said lever arm to up position upon completion of the toasting operation, movable latch means positioned to engage said control portion for maintaining the bread carrier in raised position, a first manual control for moving said latch means out of a latching position to permit the bread carrier to move to said toasting position, and a second manual control for raising the bread carrier, prior to the bread carrier being raised by said motor, to selected elevations.

4. An automatic toaster comprising, in combination, stationary structure defining a toasting chamber, a movable bread carrier in said toasting chamber having a control portion extending outwardly of said toasting chamber, bread-toasting means in said toasting chamber, elongated lever arm means pivoted intermediate its ends to the stationary structure outside of said toasting chamber and to one side of said control portion, one end of said arm means being operatively connected with said carrier through said control portion and the other end of said arm being connected to motor means, a normally open switch in circuit with said bread toasting means and positioned to be closed by the control portion of said bread carrier when the bread carrier is down in toasting position, toasting-cycle-terminating means operable to energize said motor and to move said bread carriage through said lever arm to up position upon completion of the toasting operation, movable latch means positioned to engage said control portion for maintaining the bread carrier in raised position, a first manual control for moving said latch means out of a latching position to permit the bread carrier to move to said toasting position, and a second manual control for raising the bread carrier, prior to the bread carrier being raised by said motor, to selected elevations, said second manual control including an elongated control lever pivoted on said stationary structure between spaced vertical planes through the pivot axis of said lever arm means and said control portion, and having a portion of said control lever positioned to swing in an arc transverse to said lever arm means so as to effect movement of said lever arm means under influence of said control lever.

5. An automatic toaster comprising, in combination, stationary structure defining a toasting chamber, a movable bread carrier in said toasting chamber having a control portion extending outwardly of said toasting chamber, bread-toasting means in said toasting chamber, elongated lever arm means pivoted intermediate its ends to the stationary structure outside of said toasting chamber and to one side of said control portion, one end of said arm means being operatively connected with said carrier through said control portion and the other end of said arm being connected to motor means, a normally open switch in circuit with said bread toasting means and positioned to be closed by the control portion of said bread carrier when the bread carrier is down in toasting position, toasting-cycle-terminating means operable to energize said motor and to move said bread carriage through said lever arm to up position upon completion of the toasting operation, movable latch means positioned to engage said control portion for maintaining the bread carrier in raised position, a first manual control for moving said latch means out of a latching position to permit the bread carrier to move to said toasting position, and a second manual control for raising the bread carrier, prior to the bread carrier being raised by said motor, to selected elevations, said second manual control including an elongated control lever pivoted on said stationary structure between spaced vertical planes through the pivot axis of said lever arm means and said control portion, and having a portion of said control lever positioned below said lever arm means to swing in an arc transverse to said lever arm means so as to effect movement of said lever arm means under influence of said control lever, and spring means normally biasing said lever-arm-means-engaging portion of the control lever out of the range of movement of said lever arm means.

6. In an automatic toaster of the type having stationary structure, toasting means therein, and movable structure including a movable bread carrier, a motor, and means for transmitting movement of the motor to said bread carrier; the improvement comprising, in combination: means for maintaining the bread carrier in elevated position; means for selectively releasing said bread carrier to permit same to freely move under gravity to a lowered, toasting position; timing means for timing-out a toasting period when the bread carrier is in lowered, toasting position; means including a normally open switch which becomes closed and prepared for energizing the motor only when the bread carrier is in said lowered, toasting position to effect automatic raising of the bread carrier after a toasting period has been timed-out; and a manual control separate from said movable structure and comprising an elongated lever pivotably carried on said stationary structure for engaging and manually raising the bread carrier, prior to the toasting period being timed-out, to selected heights including the height at which the bread carrier is in said elevated position in which it is maintained as aforesaid.

References Cited in the file of this patent

UNITED STATES PATENTS

| 2,420,188 | Olving | May 6, 1947 |
| 2,857,838 | Palmer | Oct. 28, 1958 |
| 2,863,377 | Huck | Dec. 9, 1958 |
| 2,920,551 | Schmall | Jan. 12, 1960 |